(12) United States Patent
Veeramasuneni et al.

(10) Patent No.: US 6,893,752 B2
(45) Date of Patent: May 17, 2005

(54) MOLD-RESISTANT GYPSUM PANEL AND METHOD OF MAKING SAME

(75) Inventors: Srinivas Veeramasuneni, Grayslake, IL (US); Rodney Phillip Musselman, Woodridge, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 10/185,481

(22) Filed: Jun. 28, 2002

(65) Prior Publication Data

US 2004/0005484 A1 Jan. 8, 2004

(51) Int. Cl.$^7$ ............................................. B32B 13/00
(52) U.S. Cl. ..................... 428/703; 428/70; 428/470; 428/704; 428/332; 106/18.32; 106/680; 106/772; 106/781; 106/783; 106/785; 427/388.4; 156/39; 156/45; 264/333
(58) Field of Search ............................. 106/18.32, 680, 106/772, 781, 783, 785; 428/70, 470, 703, 332, 704; 427/388.4; 156/39, 45; 264/333

(56) References Cited

U.S. PATENT DOCUMENTS

| | | | |
|---|---|---|---|
| 2,432,963 A | 12/1947 | Camp | |
| 3,159,640 A | 12/1964 | McClure et al. | 260/294.8 |
| 5,518,774 A | 5/1996 | Kappock et al. | 427/384 |
| 5,562,995 A | 10/1996 | Kappock et al. | 428/469 |
| 5,883,154 A | 3/1999 | Kappock et al. | 523/122 |
| 5,939,203 A | 8/1999 | Kappock et al. | 428/469 |
| 6,010,596 A | 1/2000 | Song | 162/158 |
| 6,096,122 A | 8/2000 | Kappock et al. | 106/18.36 |
| 6,342,284 B1 | 1/2002 | Yu et al. | 428/70 |
| 6,387,172 B1 | 5/2002 | Yu et al. | 106/680 |
| 6,680,127 B2 | 1/2004 | Capps | |
| 6,699,426 B1 * | 3/2004 | Burke | 264/426 |
| 2003/0035981 A1 | 2/2003 | Capps | |
| 2003/0037502 A1 | 2/2003 | Bruce et al. | |

FOREIGN PATENT DOCUMENTS

JP 04-069301 * 3/1992 ........... A01N/25/00

OTHER PUBLICATIONS

U.S. Appl. No. 60/387,000, Payne et al.
Metasol TK–100® Liquid Concentrate, Product Bulletin and MSDS, Nalco Chemical Co., Naperville, Illinois 60563–1198, 2001, 10pp., no month.

* cited by examiner

*Primary Examiner*—Deborah Jones
*Assistant Examiner*—Ling Xu
(74) *Attorney, Agent, or Firm*—Greer, Burns & Crain, Ltd.; David F. Janci; Michael Geoffrey

(57) ABSTRACT

A mold-resistant gypsum panel includes a core of an interlocking matrix of calcium sulfate dihydrate crystals, a facing material on at least one side of the panel and a salt of pyrithione dispersed through both the core and the facing materials. A method of making a mold-resistant gypsum product is also provided. A slurry of calcined gypsum, water and a water-soluble pyrithione salt is formed, then deposited on a sheet of facing material. The slurry on the facing material is shaped into a panel and maintained under conditions sufficient for the calcined gypsum to react with the water to form a core comprising an interlocking matrix of set gypsum crystals. Heating of the panel causes evaporation of the water that did not react with the calcined gypsum.

25 Claims, No Drawings

MOLD-RESISTANT GYPSUM PANEL AND METHOD OF MAKING SAME

BACKGROUND OF THE INVENTION

The present invention relates to a product and process for making gypsum panels. More particularly, the present invention relates to a gypsum panel with improved resistance to mold (also referred to as mildew).

Gypsum panels are well known building products which have been used for years. They are used primarily as an interior wall and ceiling product, but also to a certain extent as an exterior product. A slurry including calcium sulfate hemihydrate and water is used to form the core, and continuously deposited on a paper cover sheet moving beneath a mixer. A second paper cover sheet is applied thereover and the resultant assembly is formed into the shape of a panel. Calcium sulfate hemihydrate reacts with sufficient water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture.

Fungi, such as mold, may grow in environments where four key elements are present. There must be mold spores present, nutrients for the fungi to metabolize and water. Temperature is also a critical parameter for fungi growth, but numerous mold species thrive at the temperatures required for human habitation so this is often considered a given for mold growth in buildings. Although various environments provide different amounts of each of these elements, water vapor and spores are constantly in the air around us. The spores require sufficient nutrients to be able to grow if they settle on a substrate where moisture is present.

While various nutrients are generally present in dust particles in surrounding air, starches also provide sufficient nutrition for mold growth and are often present in both the cover materials and the gypsum core of gypsum panels. In gypsum panels, starch is frequently used for a number of purposes. It is used to promote adhesion between the core and the covering material. The pressed paper commonly used to cover the panels is a source of starch and the cellulosic fibers provide nutrition for mold growth. Sugar is used to coat particles of calcium sulfate dihydrate, often used as a set accelerator in the calcined gypsum slurry. Other starches are also used to modify properties of the set gypsum composition. Thus, where gypsum board panels become wet and do not dry out readily, the use of starches in covering and core materials provides a medium suitable for possible growth of mold spores. Gypsum board panels, even if not specially treated to make them mold-resistant, still will not usually experience mold growth problems in interior building applications or in other applications where they are likely to be kept dry or to dry out readily after becoming wet.

However, there are some applications where gypsum board is desirable for its fire resistance, but where it may become wet and not readily dry out. In high-rise buildings, for example, elevator shafts are built before the building is enclosed. Thick gypsum panels, such as Sheetrock® brand Gypsum Liner Panels by USG Corp., Chicago, Ill., are used to line the elevator shafts to provide fire resistance. The shaft wall may be exposed to rain during building construction, and may not have the opportunity to dry thoroughly before the building is closed in. Panels used in this environment, and other environments where mold growth is possible, are subject to improvement by increasing the resistance of the panels to the growth of molds.

Gypsum panels are known that have utilized pressed paper coverings treated with a fungicide. Treated paper is ineffective to control mold growth for a number of reasons. Many fungicides do not retain their efficacy through the process of drying the panels in a kiln due to the high temperatures. Water used in the manufacturing of gypsum panels may contain mold spores, providing a source of spores from both the air and the set gypsum. Per environmental regulations, there is a limit to the concentration of fungicide that can be present on the surface of the paper, and it appears that that concentration is not sufficient to protect both the paper and the set gypsum core.

Attempts have been made to add fungicides to the gypsum slurry, resulting in different problems. Water-soluble fungicides tend to migrate with the water during the drying process, depositing on the covering when the water evaporates. In addition to leaving the core unprotected, the paper covering may have a concentration of fungicide that is too high to meet environmental regulations. Fungicides that are insoluble are difficult to disperse in the aqueous slurry and provide no protection for the covering material. Chemicals added directly to the gypsum slurry can also have detrimental effects on the properties of the set gypsum product. When boric acid, a known fungicide, was added to a slurry in sufficient quantity to greatly inhibit mold growth, the panels were so brittle that they cracked and chipped as they moved along the rollers from the kiln.

Another technique of protecting a gypsum board is using a two-step process of covering a fungicide-containing core slurry with a treated face paper. In addition to many of the problems discussed above, use of a two-step process is more expensive than a single step process. Thus, although many fungicides are well known, this particular application poses unique problems in finding a fungicide that inhibits mold growth in both the covering and the core of gypsum board panels in a cost effective manner.

Pyrithione salts are well-known antimicrobial additives for coating applications. They are available commercially as sodium OMADINE® or zinc OMADINE, manufactured by Arch Chemicals, Inc. of Norwalk, Conn., or they can be made according to the process of U.S. Pat. No. 3,159,640, herein incorporated by reference. The prior art teaches only that these salts are useful in their wet state as preservatives or as short-term antimicrobial agents in dry, thin-film applications such as paints, adhesives, caulks and sealants. U.S. Pat. No. 5,939,203 discloses that joint compounds and patching compounds are suitable base media for use with pyrithione salts in coating compositions. Joint or patching compounds are thinly spread over joints between or imperfections in gypsum board panels, forming a thin film. The use of sodium pyrithione in these compounds would act as a wet state preservative for ready mixed products and would inhibit microbial growth on the dry film of the product.

SUMMARY OF THE INVENTION

In one aspect, the present invention features a gypsum panel having mold resistance in both the facing material and the gypsum core without separately treating them with antimicrobial agents.

More specifically, the present invention provides a mold-resistant gypsum panel that includes a core of at least ⅛ inch thickness of an interlocking matrix of calcium sulfate dihydrate crystals, a facing material on at least one side of the panel and having a salt of pyrithione dispersed through both the core and the facing material.

Another aspect of the present invention is a method of making a mold-resistant gypsum product. A slurry of calcined gypsum, water in excess of the amount needed to hydrate all of the calcined gypsum to form calcium sulfate dihydrate and a water soluble pyrithione salt is formed, then deposited on a sheet of facing material. The slurry on the facing material is shaped into a panel and maintained under conditions sufficient for the calcined gypsum to react with a portion of the water to form a core comprising an interlocking matrix of set gypsum crystals. Heating of the panel cause evaporation of the water that did not react with the calcined gypsum. The product of this process is another aspect of this invention.

The gypsum panel of this invention is advantageous for use in areas, such as elevator shaft walls, where there is potential for the gypsum panels to become wet. Use of pyrithione salts provides mold-resistance not only to the surface of the panels with which it is made, but also reduces mold growth throughout the thickness of the panel.

Addition of pyrithione salt to the gypsum slurry also serves to protect both the set core and the facing material in a single step. During setting and drying, a portion of the salt migrates from the core to the facing. Surprisingly, a portion of the fungicide is retained in the core even when water in excess of that required for hydration moves to the panel surface and evaporates during drying. Thus the step of adding pyrithione salts imparts an improved mold resistance throughout the thickness of the panel.

DETAILED DESCRIPTION OF THE INVENTION

It has now been surprisingly found that when soluble salts of pyrithione are added to a calcined gypsum slurry, a portion of the pyrithione compound remains in the core, while a portion migrates to the facing material, providing protection to both the facing material and the gypsum core.

Any water-soluble salt of pyrithione having antimicrobial properties is useful in the present gypsum panel. Pyrithione is known by several names, including 2 mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). The sodium derivative ($C_5H_4NOSNa$), known as sodium pyrithione (CAS Registry No. 3811-73-2), is one embodiment of this salt that is particularly useful. Pyrithione salts are commercially available from Arch Chemicals, Inc. of Norwalk, Conn., such as Sodium OMADINE or Zinc OMADINE.

Useful pyrithione salts are very soluble in water. Where solubility is measured on a weight percent basis in water at 77° F. (25° C.) and at pH of 7, the solubility of the pyrithione salt is sufficient to create a concentration of dissolved salt in the water of at least 0.1% of the resultant solution. Sodium OMADINE, a preferred pyrithione, has a solubility of about 53%. Zinc OMADINE, which shows no migration of the fungicide into the facing material, has a solubility of about 0.0015%. Preferably, the solubility of the pyrithione salt is from about 0.1% to about 75%, more preferably from about 5% to about 60% or even more preferably from about 30% to about 55%. Other pyrithione salts with a solubility above 0.1% are expected to be suitable for use with the present gypsum panel.

Solubility of a fungicide is not a guarantee that it will remain completely dispersed in the slurry or migrate into the facing material along with the water that seeps out of the core and through the facing material during vaporization, while, most surprisingly, an effective portion of the pyrithione salt does not migrate and appears to become anchored in the core by some unknown mechanism. Molecules that are very soluble and highly mobile are expected to move with the water as it evaporates and be left on the surface of the gypsum board panel. A species of the fungicide highly reactive with the calcium sulfate of the gypsum or any additives used has the potential to form an insoluble species that does not migrate or form a precipitate that settles out. The ability of the fungicide to migrate, its reactivity with components of the slurry and the solubility act together to determine whether a fungicide is suitable for use with this invention. Pyrithione salts having the requisite solubility are useful in this invention.

It is particularly surprising that the pyrithione salt protects both the gypsum core and the facing material. While not wishing to be bound by theory, it is believed that a portion of the pyrithione salt migrates into the facing paper, while a portion becomes anchored in the gypsum core. Perhaps the $Ca^{++}$ ion slowly displaces the sodium ion to react with the pyrithione ion, forming a less mobile or less soluble species. It is also possible that as the matrix of calcium sulfate dihydrate molecules begins to form, the larger pyrithione ions become less mobile and become trapped in the interstices of the matrix due to their size. Either of these theories, both of them or even another theory entirely could be responsible for the observed distribution of the fungicide throughout the core and the facing material. Regardless of the actual mechanism, fungicides that display this behavior are useful in the gypsum board of this invention.

The pyrithione salt is added to the gypsum slurry in any effective amount. In one embodiment, at least 100 parts of salt per million parts of calcined gypsum on a weight basis are used. All concentrations of the pyrithione salt are calculated as the equivalent amount of the sodium derivative and based upon the weight of the calcined gypsum. Preferred sodium pyrithione concentrations include at least 100 ppm, more preferably from about 100 ppm to about 600 ppm, still more preferably from about 100 ppm to about 400 ppm, even more preferably from about 200 ppm to about 400 ppm and most preferably from about 200 ppm to about 300 ppm.

Whereas a gypsum board panel has a plurality of sides or faces, it is not necessary that all faces be covered with a facing material. In some circumstances, one or more sides are optionally left unfaced. Panels intended for use with this invention include at least one side with a facing material that is susceptible to supporting fungus growth. The facing material need not contain a nutrient, but will be more susceptible to supporting fungus growth if it already contains a nutrient.

A "nutrient-containing" facing material is one that includes any nutrients capable of feeding fungus growth to a detectable level. Facing materials containing paper, pulp or any starch are the most common. The nutrient is suitably present in the finished gypsum panel, and need not be an inherent component of the facing material alone. Starches, for example, are frequently added to the core slurry to promote adhesion between the core and facing paper. The water-soluble starch is carried into the paper as excess water is driven from the core and acts as an adhesive. Presence of the starch in the facing material after drying is sufficient to feed fungal growth, and thus would be a "nutrient-containing" facing for the purposes of this invention. Pressed paper is a preferred facing material due to its common availability and low cost. Facing paper is optionally bleached or unbleached. The paper comprises one or more layers or plies. It is contemplated that, where multiple plies are used, it is suitable for one or more plies to differ from each other in one or more respects. It is also contemplated that facing material other than paper be used in this invention.

The slurry used to make the gypsum core comprises water and calcined gypsum. Any calcined gypsum comprising calcium sulfate hemihydrate, calcium sulfate anhydrite or both is useful in this slurry. Calcium sulfate hemihydrate can produce at least two crystal forms, the alpha and beta forms. Beta calcium sulfate hemihydrate is commonly used in gypsum board panels, but is also contemplated that panels made of alpha calcium sulfate hemihydrate are also useful in this invention. The fungicide, as well as other additives discussed below, are added to the slurry.

Water is present in any amount useful to make gypsum board panels. Sufficient water is added to the dry components to make a flowable slurry. A suitable amount of water exceeds the amount needed to hydrate all of the calcined gypsum to form calcium sulfate dihydrate. The exact amount of water is determined, at least in part, by the application with which the product will be used, the amount and type of additives used and whether the alpha or beta form of the hemihydrate is used. A water-to-stucco ratio is calculated based on the weight of water compared to the weight of the dry calcined gypsum. Preferred ratios range from about 0.6:1 to about 1:1.

In some embodiments of the invention, additives are included in the gypsum slurry to modify one or more properties of the final product. Concentrations are reported in amounts per 1000 square feet of finished board panels ("MSF"). Starches or defoamers are used in amounts from about 6 to about 20 lbs./MSF to increase the density and strengthen the product. Set retarders (up to about 2 lb./MSF) or accelerators (Up to about 35 lb./MSF) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from USG Corporation, Southard, Okla. Plant, and is made according to U.S. Pat. No. 3,573,947, herein incorporated by reference. Glass fibers are optionally added to the slurry in amounts of at least 9 lb./MSF. Up to 15 lb./MSF of paper fibers are also added to the slurry. Dispersants or surfactants are common additives to modify the viscosity or surface properties of the slurry. Naphthalene sulfonates are preferred dispersants, such DILOFLOW® from Geo Specialty Chemicals, Cleveland, Ohio. Preferably, a dispersant is added to the core slurry in amounts up to 16 lb./MSF. Wax emulsions, discussed in more detail below, are added to the gypsum slurry in amounts up to 20 gal./MSF to improve the water-resistency of the finished gypsum board panel. Pyrithione salts are useful in addition to other preservatives. There are no known adverse effects when pyrithione salts are used together with any other additives. It is therefore contemplated that pyrithione salts are useful when combined with any additives added to the gypsum core slurry to modify other properties of the set gypsum core.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. from GEO Specialty Chemicals, Ambler, Pa. Foams and a preferred method for preparing foamed gypsum products are disclosed in U.S. Pat. No. 5,683,635, herein incorporated by reference.

A trimetaphosphate compound is added to the gypsum slurry in some embodiments to enhance the strength of the product and to reduce sag of the set gypsum. Preferably the concentration of the trimetaphosphate compound is from about 0.1% to about 2.0% based on the weight of the calcined gypsum. Gypsum compositions including trimeraphosphate compounds are disclosed in U.S. Pat. No. 6,342,284, herein incorporated by reference. Exemplary trimetaphosphate salts include sodium, potassium or lithium salts of trimelaphosphate, such as those available from Astaris, LLC., St. Louis, Mo.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition.

A preferred embodiment of this invention comprises a water resistant gypsum board panel with mold resistance. Manufacture of water-resistant gypsum board panels, known as "green board" is well known in the art. One embodiment of a water-resistant gypsum board is taught in Camp, U.S. Pat. No. 2,432,963, herein incorporated by reference, wherein from about 5% by weight to about 15% of a wax-asphalt emulsion is added to the gypsum slurry. Paraffin wax is the preferred wax, and preferably has a melting point less than 165° F. (74° C.). It is present in a ratio of wax to asphalt of about 1:1 to about 1:10. A preferred asphalt has a ring-and-ball softening point that is not above 185° F. (85° C.). The emulsion of wax and asphalt is formed by dispersing the wax and asphalt using a dispersing agent, then is added to the gypsum slurry in any convenient way.

Another embodiment of the water-resistant gypsum board panel is taught in U.S. Pat. No. 6,010,596 to Song, herein incorporated by reference, wherein a wax emulsion is added to the core slurry.

The present gypsum panel exceeds ⅛ inch in thickness to avoid excessive breakage during manufacture. Preferably the gypsum panels are from about ⅜ inch (9.5 mm) to about 2 inches (51 mm), from about ¾ inch (19 mm) to about 1¼ inch (32 mm) or from about ½ inch (13 mm) to about 1 inch (25 mm) in thickness. The exact thickness of the panel depends upon the end use to which it will be put. Thicker panels are frequently used where high ratings for fire resistance are desired. Relatively thin panels are contemplated for use in areas of high humidity, such as a bathroom in a home. SHEETROCK brand Gypsum Liner Panels 1 inch thick are used to line elevator shafts in commercial buildings.

While individual panels can be made in a batch process, more usually gypsum board is made in a continuous process formed into a long panel and cut into panels of desired lengths. The formed facing material is obtained and put into place to receive the gypsum slurry. Preferably, the facing material is of a width to form a continuous length of panel that requires only two cuts to make a panel with the desired finished dimensions. Facing material is continuously fed to the board line.

The slurry is formed by mixing the dry components and the wet components together. Dry components of the slurry, the calcined gypsum and any dry additives, are blended together prior to entering the mixer. Water is measured directly into the mixer. Liquid additives are added to the water, and the mixer is activated for a short time to blend them. If purchased from Arch Chemicals, sodium OMADINE is sold in the form of a 40% suspension of sodium pyrithione in water, and is mixed with the slurry water. The dry components are added to the liquid in the mixer, and blended until the dry components are moistened.

The slurry is then mixed to achieve a homogeneous slurry. Usually, an aqueous foam is mixed into the slurry to control the density of the resultant core material. Such an aqueous foam is usually generated by high shear mixing of an appropriate foaming agent, water and air to prior to the introduction of the resultant foam into the slurry. The foam can be inserted into the slurry in the mixer, or preferably, into the slurry as it exits the mixer in a discharge conduit. See, for example, U.S. Pat. No. 5,683,635, herein incorporated by reference. In a gypsum board plant, frequently solids and liquids are continuously added to a mixer, while the resultant slurry is continuously discharged from the mixer, and has an average residence time in the mixer of less than 30 seconds.

The slurry is continuously dispensed through one or more outlets from the mixer through a discharge conduit and deposited onto a moving conveyor carrying the facing material and formed into a panel. Another paper cover sheet is optionally placed on top of the slurry, so that the slurry is sandwiched between two moving cover sheets which become the facings of the resultant gypsum panel. The thickness of the resultant board is controlled by a forming roll, and the edges of the board are formed by appropriate mechanical devices which continuously score, fold and glue the overlapping edges of the paper. Additional guides maintain thickness and width as the setting slurry travels on a moving belt. While the shape is maintained, the calcined gypsum is maintained under conditions sufficient (i.e. temperature of less than about 120° F.) to react with a portion of the water to set and form an interlocking matrix of gypsum crystals. The board panels are then cut, trimmed and passed to dryers to dry the set but still somewhat wet boards.

Preferably, a two-stage drying process is employed. The panels are first subjected to a high temperature kiln to rapidly heat up the board and begin to drive off excess water. The temperature of the kiln and the residence time of the board vary with the thickness of the panel. By way of example, a ½-inch board (12.7 mm) is preferably dried at temperatures in excess of 300° F. (149° C.) for approximately 20 to 50 minutes. As water at the surface evaporates, it is drawn by capillary action from the interior of the panel to replace the surface water. The relatively rapid water movement assists migration of the starch and the pyrithione salt into the paper. A second-stage oven has temperatures less than 150° F. (65.5° C.) to limit calcination of the board.

There is no standard test for the measurement of mold growth on the surface of gypsum board panels. As a result, the industry has adopted ASTM Standard D3273, herein incorporated by reference, originally developed for testing mold growth on paints and other interior surface coatings. This procedure, described briefly below, was used to evaluate the relative resistance of gypsum board panels to surface mold fungi and mildew growth in a severe interior environment. Performance of a panel at a certain rating in accordance with the Test Method D3273 does not imply any specific period of time for a fungal free panel. However, a better-rated product nearly always performs better in actual end use.

Samples of ½ inch (12.7 mm) gypsum board panel (Example 1) or 1 inch (25.4 mm) panel were measured and cut to three inches by eleven inches. The samples were hung vertically in an environmental chamber three inches above soil that had been impregnated with spores from several specific varieties of mold as specified in the rest procedure. Conditions in the chamber were maintained at 90° F. (32.2° C.) and 90% relative humidity for a total of four weeks. At the end of each week, random portions of the sample were studied under a microscope to determine the extent of mold growth on the surface of the sample. A rating was assigned to each sample at that time whereby a sample given a rating of ten had no mold growth and a sample that earned a rating of zero had essentially 100% mold coverage. After the microscopic analysis, the sample was returned to the environmental chamber.

A slight modification was made to the D3273 procedure to accommodate study of both the face paper and the gypsum core in Example 1. Samples were prepared to insure that the gypsum core was exposed to the environmental conditions at the cut edge, and that none of the edges was covered by the facing paper. When the samples were rated at weekly intervals, coverage of the gypsum core was determined by microscopic analysis, as well as study of the surface of the facing paper. Ratings were independently assigned to the gypsum core and the facing.

In the following examples, concentrations are reported on a weight basis of the dry components unless otherwise indicated. Concentrations of commercial products are measured on the basis of 1000 ft$^2$ ("MSF") of finished gypsum panel, and therefore change depending on the thickness of the board being produced.

EXAMPLE 1

Gypsum board panels were made in the laboratory having the composition shown in Table I.

TABLE I

Composition of Laboratory Samples

| Component | Control | T1 |
| --- | --- | --- |
| Beta Calcium Sulfate Hemihydrate | 2.2 lbs. (1000 g.) | 2.2 lbs. (1000 g.) |
| Water | 47.3 fl. oz. (1400 ml) | 47.3 fl. oz. (1400 ml) |
| CSA | 0.017 oz. (0.5 g.) | 0.017 oz. (0.5 g.) |
| Pregelatinized Starch | 0.175 oz. (5 g.) | 0.175 oz. (5 g.) |
| Sodium trimetaphosphate | 0.035 oz. (1 g.) | 0.035 oz. (1 g.) |
| Sodium Pyrithione (40% aqueous solution) | 0 | 0.035 oz. (1 g.) |

The beta hemihydrate is available as stucco from the Southard, Okla. plant of USG Corporation. Sodium trimetaphosphate is available from Astaris, LLC. St. Louis, Mo. The pregelatinized starch is PCF 1000 starch, commercially available from Lauhoff Grain Company, St. Louis, Mo. The sodium pyrithione used was Sodium OMADINE from Arch Chemicals, Inc., Norwalk, Conn., at a concentration of 400 ppm based on the weight of the calcined gypsum.

For each sample, the above ingredients were mixed together and allowed to soak for approximately 15 seconds. The slurry was mixed in a Waring blender for 15 seconds at medium speed, then poured onto a piece of an untreated, water resistant paper to a thickness of ½ inch. When the boards were set, they were dried in a 350° F. kiln for approximately 30 minutes, then at 110° F. overnight.

Both samples were subjected to the temperature and humidity of the environmental chamber according to ASTM Test Method D3273 described above. Ratings of each of the samples at each of the four weekly intervals is shown in Table II.

TABLE II

Mold-Resistance Testing of Laboratory Samples

| | Control | | Ti | |
| --- | --- | --- | --- | --- |
| Time in Chamber | Paper | Core | Paper | Core |
| 1 week, 2 days | 0 | 0 | 10 | 10 |
| 2 weeks | 0 | 0 | 8–9 | 9 |

TABLE II-continued

Mold-Resistance Testing of Laboratory Samples

| Time in Chamber | Control | | Ti | |
| --- | --- | --- | --- | --- |
| | Paper | Core | Paper | Core |
| 3 weeks | 0 | 0 | 9 | 9 |
| 4 weeks | 0 | 0 | 10 | 10 |

Table II shows the test results of the microbial bioassay of the control and test sample, T1. The control sample was virtually continuously disfigured over the entire sample surface within 9 days of the start of the procedure, while both the paper surface and the gypsum core of the present composition have very little mold growth.

It is interesting to note that in the inventive sample, T1, about 10% of the paper and core had mold growth in weeks 2 and 3. However, by week 4, the mold was gone. It appears as though molds started to grow, but were killed by the fungicide over the course of the test. Some variations in results are also expected due to randomness in selection of areas for microscopic study.

EXAMPLE 2

Three samples of SHEETROCK® brand Gypsum Liner Panels were manufactured at a board plant substantially using the commercial process described above. An unmodified control sample was labeled B133, the composition of which is provided in Table III.

TABLE III

Composition of B133 Control Sample

| Component | B133 |
| --- | --- |
| Beta Calcium Sulfate Hemihydrate | 3400 lbs. |
| Water | 2278 lbs. |
| CSA | 12 lbs./1000 ft$^2$ |
| Starch, USG 95 | 8 lbs./1000 ft$^2$ |
| Chopped glass fibers | 11 lbs./1000 ft$^2$ |
| Dispersant | 11.5 lbs./1000 ft$^2$ |
| Foaming Agent | 0.35 lbs./1 000 ft$^2$ |
| Wax Emulsion | 18 gal./1000 ft$^2$ |
| Retarder | 0.2 lbs./1000 ft$^2$ |
| Fungicide | 0 |

A second sample, B134, included 18 gal./MSF of a wax emulsion and 3 lb./MSF boric acid added to the gypsum core. This second sample also used a fungicide treated paper. Paper pre-treated with METASOL TK-100® fungicide was purchased from Caraustar Industries of Austell, Ga. Wax emulsion (AQUALITE 70 from Bakor, Quebec, Calif.) was added to the test sample to improve the water repellency of the product. The dispersant was DILOFLOW from (GEO Specialty Chemicals, Cleveland, Ohio). The foaming agent was ALPHA FOAMER from (Stepan Chemicals, Ontario Calif.). A VERSENEX 80 (Dow Chemical, Midland, Mich.) retarder was used.

Sodium OMADINE was used in a third sample, B135, in place of the boric acid. B135 uses the same treated paper and wax emulsion, in the same concentration, as used in B134. The sodium OMADINE was used in a concentration of 2 lb./MSF, which is equivalent to 200 ppm. A summary of the additives to the B133 composition of Table III is provided in Table IV below:

TABLE IV

Composition of Test Samples

| Sample | B-133 | B-134 | B-135 |
| --- | --- | --- | --- |
| Paper | Untreated | Treated | Treated |
| Wax Emulsion | 0 | 18 gal/.MSF | 18 gal./MSF |
| Core Fungicide | None | Boric Acid | Sodium OMADINE |
| Fungicide conc. | 0 | 3 lb./MSF | 2 lb./MSF |

All samples were subjected to the temperature and humidity of the environmental chamber according to ASTM Test Method D 3273 described above. Test samples were evaluated weekly for four weeks. Ratings of each of the samples at each of the four weekly intervals is shown in Table V.

TABLE V

Mold-Resistance Testing of Commercial Samples

| Time in Chamber | B133 | B134 | B135 |
| --- | --- | --- | --- |
| 1 week + 2 days | 0 | 10 | 10 |
| 2 weeks | 0 | 0 | 9 |
| 3 weeks | 0 | 0 | 6 |
| 4 weeks | 0 | 0 | 5 |

Table V shows the test results of the microbial bioassay of the samples B133, B134 and B135. The control sample was virtually continuously disfigured over the entire sample surface within 9 days of the start of the procedure, while the treated samples show inhibited mold growth on the treated paperfacing. Sample B134 using another fungicide, boric acid, maintained its mold resistance for the first nine days, then rapidly succumbed to mold growth and was continuously disfigured by the 14$^{th}$ day. The sodium pyrithione sample, B135, demonstrated improved mold resistance over the entire life of the test.

A comparison of samples B134 and B135 demonstrates the importance of pyrithione in this invention. The use of other fungicides, such as boric acid, does not afford the same degree of mold resistance provided by sodium pyrithione. Although pyrithione salts are the only fungicides known to be useful in this invention, it is contemplated that other fungicides may be found that are suitable for use in the gypsum core yet migrate into the facing paper of the finished gypsum board panel.

EXAMPLE 3

An additional test was conducted using concentrations of sodium pyrithione lower than Example 1 with untreated face paper.

The commercial samples were made according to the procedures of Example 2, but without pre-treating the facing paper with fungicide. Control Sample 2 was made according to the composition of the B133 composition described in Table III. Test sample T2 was made according to the same base composition, but with 2 lb./MSF of sodium OMADINE added, for a concentration of 200 ppm. Untreated paper was used and neither sample included a wax emulsion. Testing was carried out according to D 3273 described above. Results for the first two weeks of the test are summarized below.

TABLE V

Mold-Resistance Testing of Commercial Samples

| Time in Chamber | Control 2 | T2 |
|---|---|---|
| 1 week | 4 | 9–10 |
| 2 weeks | 1 | 9–10 |

Even at concentrations of 200 ppm of sodium OMADINE in the T2 panels showed improved mold resistance compared to untreated panels. Even though it is difficult to compare results from different examples, it is interesting to note that after two weeks, T2, using untreated paper, provided about the same mold resistance as B135, which used fungicide-treated paper.

While a particular embodiment of the present mold resistant gypsum panel and method for making it has been shown and described, it will be appreciated by those skilled in the art that changes and modifications may be made thereto without departing from the invention in its broader aspects and as set forth in the following claims.

What is claimed is:

1. A method of making a mold-resistant gypsum product comprising:
   forming a slurry of calcined gypsum, water in excess of the amount needed to hydrate all of the calcined gypsum to form calcium sulfate dihydrate, and at least 100 ppm of a water soluble pyrithione salt calculated as the equivalent sodium salt and based on the weight of the calcined gypsum;
   depositing the slurry on a sheet of facing material;
   shaping the slurry on the facing material into a panel;
   maintaining the slurry under conditions sufficient for the calcined gypsum to react with a portion of the water to form a core comprising an interlocking matrix of set gypsum crystals.

2. The method according to claim 1 wherein the pyrithione salt comprises sodium pyrithione.

3. The method according to claim 1 wherein the slurry further comprises at least one of a set accelerator, a set retarder, an aqueous foam, a dispersant, a surfactant and a starch.

4. The method according to claim 1, wherein the facing material contains no fungicide prior to said depositing of the slurry.

5. The method according to claim 1, wherein the facing material comprises paper.

6. The method according to claim 5 wherein said paper comprises a multi-ply pressed paper.

7. The method of claim 1 wherein said slurry comprises at least 0.6 parts by weight water per part of calcined gypsum.

8. The method of claim 1 wherein said pyrithione salt is present in the slurry at a concentration of at least 200 ppm, calculated as the equivalent sodium salt and based upon the weight of the calcined gypsum.

9. The method of claim 1 further comprising placing a second sheet of facing material over the slurry prior to said shaping step.

10. The method of claim 1 wherein said calcined gypsum comprises beta calcium sulfate hemihydrate.

11. The method according to claim 1 further comprising moving a portion of the water-soluble pyrithione salt from the core to the facing material in water.

12. The method of claim 1 further comprising heating the panel to cause evaporation of the water that did not react with the calcined calcined gypsum.

13. The method of claim 12 wherein said heating step comprises heating the gypsum board in a kiln at temperatures above 300° F.

14. The method of claim 1 further comprising adding a water resistant additive to the slurry.

15. A method of making a mold-resistant gypsum product comprising:
   forming a slurry of calcined gypsum, water in excess of the amount needed to hydrate all of the calcined gypsum to form calcium sulfate dihydrate, a water resistant additive and a water soluble pyrithione salt;
   depositing the slurry on a sheet of facing material;
   shaping the slurry on the facing material into a panel; and
   maintaining the slurry under conditions sufficient for the calcined gypsum to react with a portion of the water to form a core comprising an interlocking matrix of set gypsum crystals.

16. The method of claim 15 wherein said water resistant additive is a wax emulsion or a wax-asphalt emulsion.

17. A mold-resistant gypsum panel having a plurality of sides, comprising a core of at least ⅛ inch thickness of an interlocking matrix of calcium sulfate dihydrate crystals, a facing material on at least one side of said panel and having at least 100 ppm of a salt of pyrithione calculated as the equivalent sodium salt and based on the weight of the calcium sulfate dihydrate and being dispersed through said core and said facing material.

18. The panel of claim 17 wherein said facing material is paper.

19. The panel of claim 17 wherein said core has facing material on at least two sides.

20. The panel of claim 17 wherein said panel further comprises at least one of a set accelerator, a set retarder, a foaming agent, a dispersant, a surfactant and a starch.

21. The panel of claim 17 wherein said pyrithione salt is present in the slurry at a concentration of at least 200 ppm, calculated as the equivalent sodium salt and based upon the weight of the calcined calcium sulfate dihydrate.

22. The panel of claim 17 further comprising a water resistant additive.

23. The panel of claim 22 wherein said water resistant additive is a wax emulsion or a wax-asphalt emulsion.

24. The panel of claim 17 further comprising a second fungicide applied to said facing material.

25. A mold-resistant gypsum panel made according to a process comprising:
   forming a slurry of calcined gypsum, water in excess of the amount needed to hydrate all of the calcined gypsum to form calcium sulfate dihydrate and at least 100 ppm of a water soluble pyrithione salt calculated as the equivalent sodium salt and based on the weight of the calcium sulfate dihydrate;
   depositing the slurry on a sheet of facing material;
   shaping the slurry on the facing material into a panel;
   maintaining the slurry under conditions sufficient for the calcined gypsum to react with a portion of the water to form a core comprising an interlocking matrix of set gypsum crystals.

* * * * *